Nov. 12, 1963   F. Q. RAST   3,110,777
SEQUENCE TIMER FOR SELECTIVE PROGRAMING OF
ELECTRICALLY ACTUATED MECHANISMS
Filed March 10, 1961   6 Sheets-Sheet 4

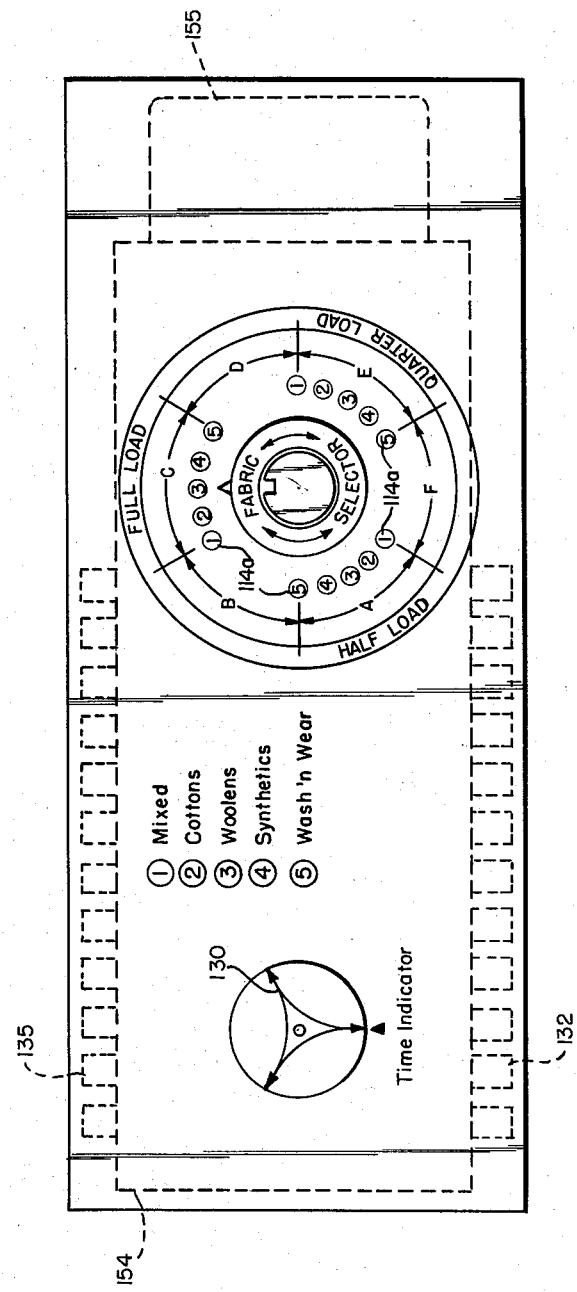

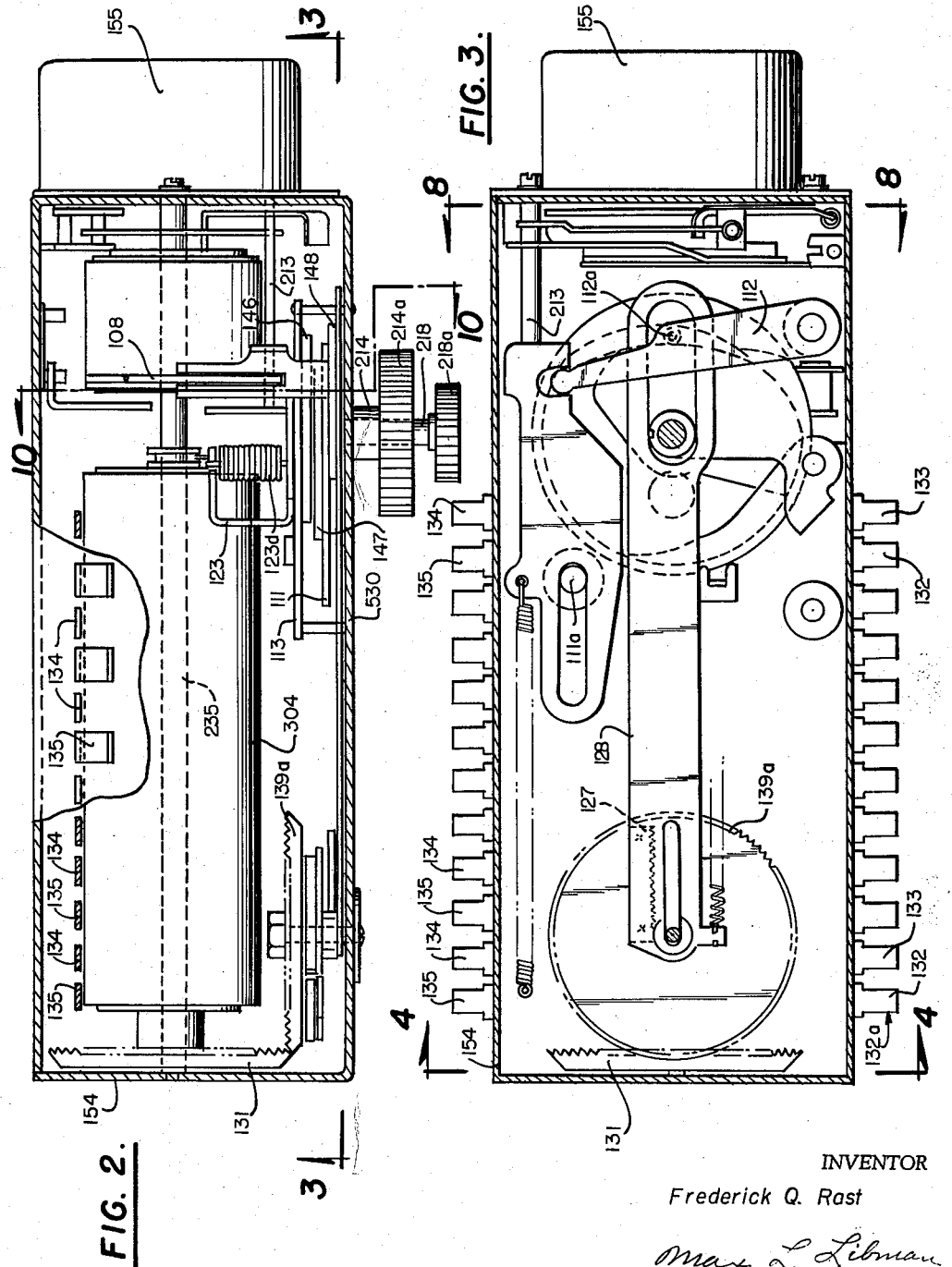

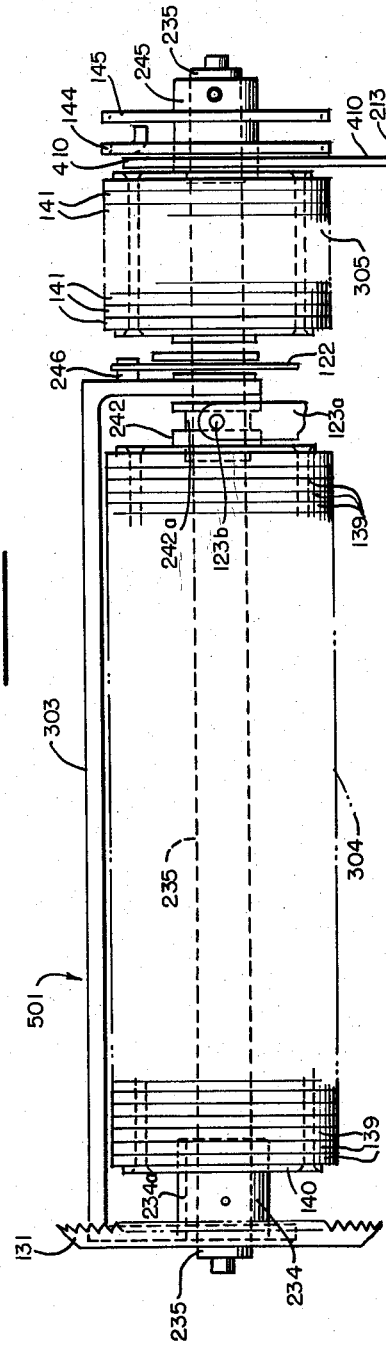

INVENTOR
Frederick Q. Rast

BY

ATTORNEY

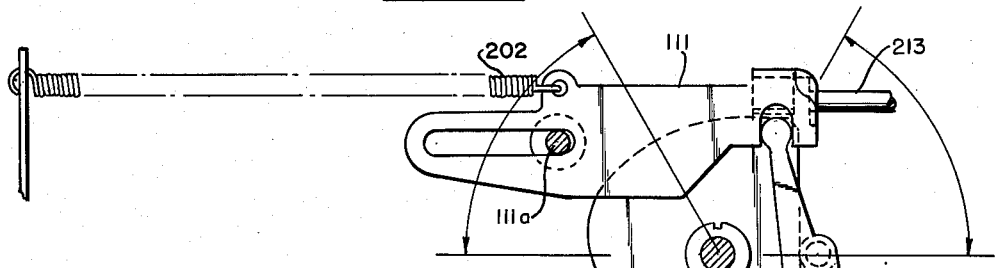
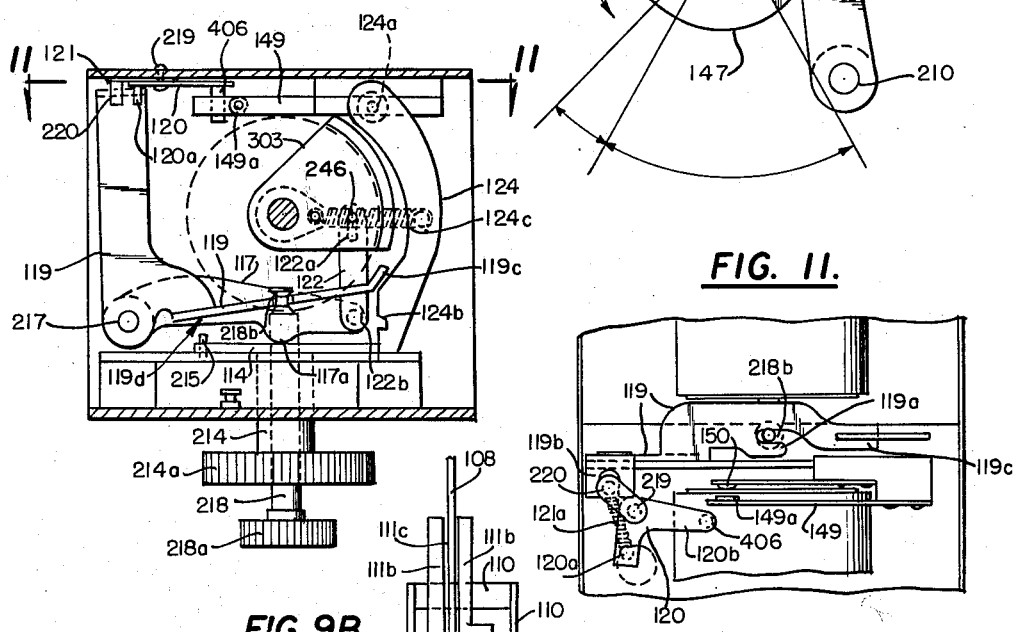
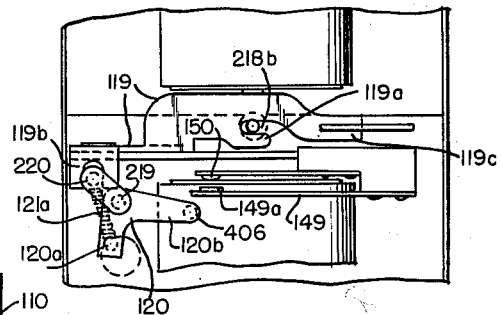
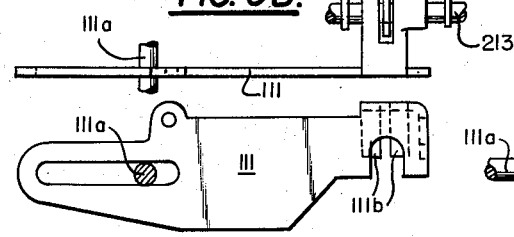
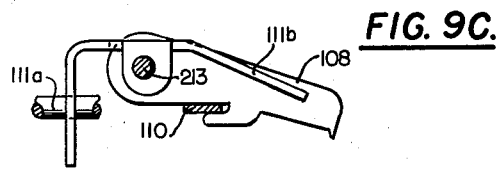

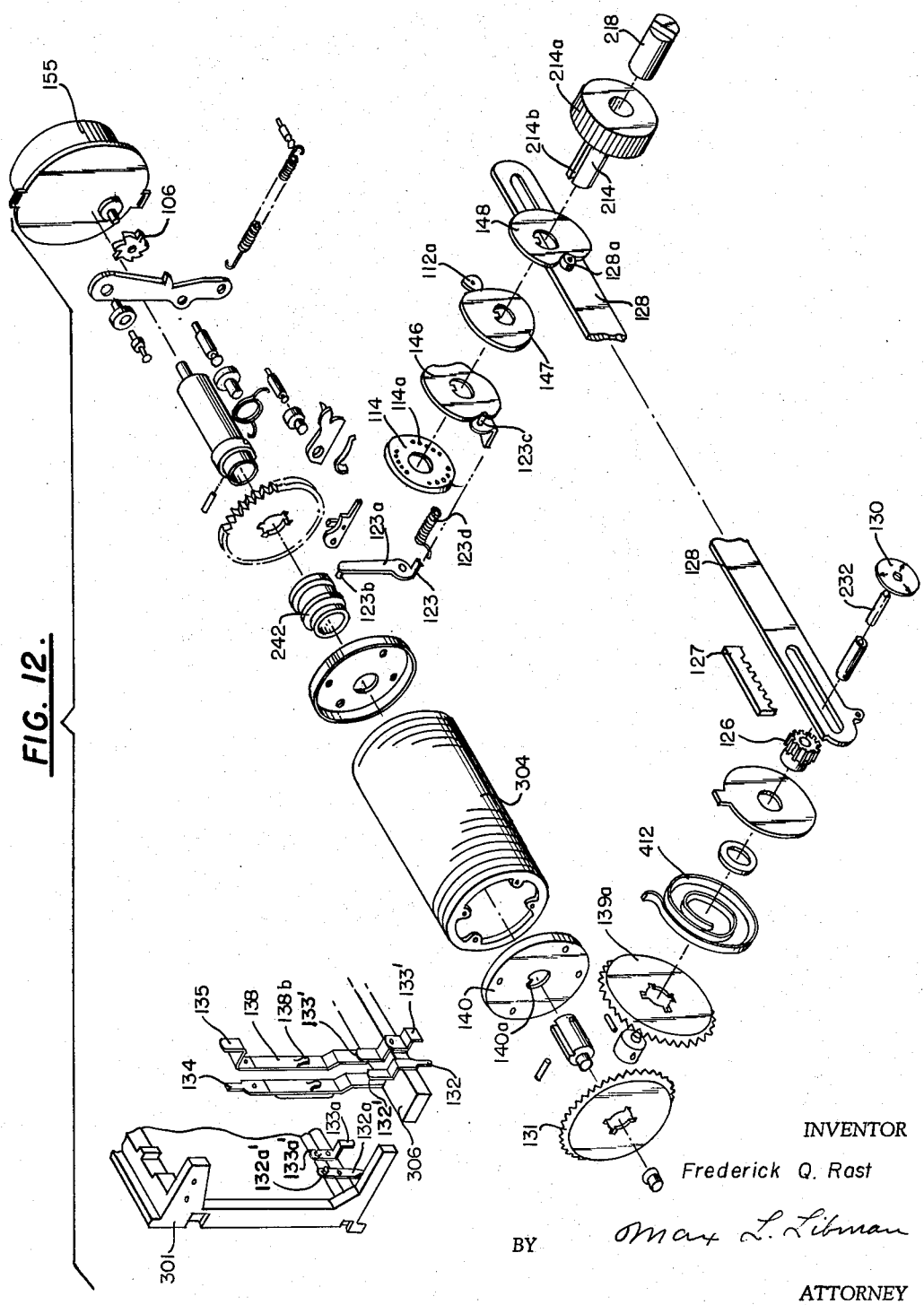

United States Patent Office 3,110,777
Patented Nov. 12, 1963

3,110,777
SEQUENCE TIMER FOR SELECTIVE PROGRAMING OF ELECTRICALLY ACTUATED MECHANISMS
Frederick Q. Rast, Stamford, Conn., assignor, by mesne assignments, to Robertshaw Controls Company, a corporation of Delaware
Filed Mar. 10, 1961, Ser. No. 94,880
17 Claims. (Cl. 200—38)

This invention relates to sequence timers for electrically controlled mechanisms having a number of different control devices which are to be actuated in various sequences and combinations in order to effect the desired operation. An example is found in clothes washing machines, which can be set for a variety of different operations as required by different fabrics, size of load, etc. Modern washing machines are commonly equipped with a number of controls resettable to perform these different operations in various combinations.

It is a major object of the present invention to provide a single control element which can be set to any one of a large number of control operations, the sequence timer thereafter energizing all of the necessary control circuits in the proper sequence and for the proper intervals to accomplish the necessary operations. The invention will therefore be described in connection with a timer intended primarily for use with such washing machines, but it will be understood that it is not necessarily so restricted, and is applicable to any control use where similar programing operations are required.

Prior art sequence timers have either required that a plurality of different control knobs be set, corresponding to the different operations desired, or else were very large, complex, and bulky devices. Since the machines are to be operated by mechanically untrained housewives, it is obviously desirable to reduce the control operations to a minimum, and the present invention accomplishes this by providing a single control setting for every desired operation. To be commercially practical, this must be accomplished by means which are competitive in price and complexity with those presently available.

It is therefore a major object of the invention to reduce the complexity of timer devices capable of producing corresponding operations.

The invention comprises a compact unit having a control knob on its front face which is settable to a large number of different positions, e.g., fifteen positions in the example which will be described, and having the usual start switch, which starts a clock motor to rotate a cam drum, or rather a pair of cam drums, one of which determines the times when the other will be rotatably driven by the motor. The latter or switch-controlling cam drum bears a plurality of cam surfaces which, as the drum is rotated, actuate a plurality of switches to open and close times determined by the cam contours so as to accomplish the necessary operations. In prior art arrangements, cam control switches have been used, but these are driven continually during the operation of the device; since each cam actuates its corresponding switch only at comparative infrequent intervals, it is obvious that most of the time the cam drum is rotating without accomplishing anything, nevertheless, cam drum area must be provided to take care of this interval. In accordance with the present invention, the switch-controlling cam drum is moved only when a change in operation is required, and its movement is controlled by the second cam drum, the contours of which are arranged so that the switch-controlling cam drum is operated only when actually needed. In this manner, as will be shown, the switch-controlling cam drum is utilized very efficiently, and a relatively small drum can accomplish the operations which have heretofore required a drum several times larger. It is therefore a major object of the invention to provide, in a sequence timer, switch-controlling cam means selectively moved by a second cam means which is the time-determining means and is driven at a constant rate during the operation of the device.

A further object is to provide, in a rotary drum cam driver which is settable both radially and axially to different positions, means for disengaging the cam followers from the cam surfaces with which they are normally engaged, during the operation of selectively setting the device.

Still another object is to provide safety interlocks so that the timer, or a washing machine controlled by the timer, cannot be improperly operated. Specifically, safety interlock means are provided so that the starting switch cannot be operated until the control setting knob, which controls the operation which is to be selected, has been properly set to a specific cooperation. This is necessary because starting the machine while the control knob is at some intermediate position between settings might damage both the control machinery and the associated washing machine, and might also, under some circumstances, be unsafe for the operator.

The specific nature of the invention, as well as other objects, will clearly appear from a description of a preferred embodiment as shown in the accompanying drawings, in which:

FIG. 1 is a front elevation of the front panel of the timer unit, showing a sequence of typical control operations;

FIG. 2 is a top plan view of the timer unit, with most of the upper side of the housing broken away;

FIG. 3 is a front sectional view of the timer unit taken on line 3—3 of FIG. 2;

FIG. 4 is a view taken on line 4—4 of FIG. 3;

FIG. 5 is a side elevation of the contact and timer drum assembly mounted on the main shaft;

FIG. 6 shows the development of a typical lateral positioning cam surface and the cam follower therefor;

FIG. 7 is a similar view of the radial positioning cam and its associated cam follower mechanism;

FIG. 9 shows the timer drum cam and its associated follower mechanism;

Figure 10A:
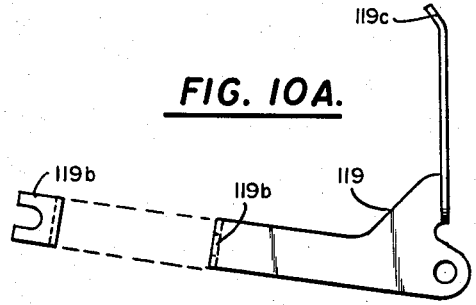
Figure 10B:
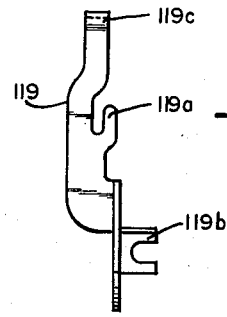

FIGS. 9A, 9B, and 9C are respectively front, end and plan detail views of the timer drum cam follower mechanism;

FIG. 10 is a sectional view taken on line 10—10 of FIG. 2 showing some of the details of the switch operating mechanism and safety interlocks;

FIGS. 10A and 10B show details of one element of FIG. 10;

FIG. 11 is a broken-away view taken on line 11—11 of FIG. 10; and

FIG. 12 is an exploded perspective view showing the cooperative relationship of the major elements of the mechanism.

As will be seen from FIGS. 1, 2, 3 and 4, the entire timer is contained in a substantially rectangular housing 154 mounting a small electric clock-type motor 155 on one end thereof. This motor, when energized, serves to drive the cam and timer drums of the device. The overall length of the entire assembly, including the motor, is less than nine inches, so that it will be apparent that compactness is a very outstanding feature of the device.

Protruding from the top and bottom rear portions of the housing 154 are a number of terminal strips 132–135 inclusive, which are mounted on suitable insulating strips or blocks 301 and 306, suitably secured to the casing 154. As best shown in FIGS. 2, 4 and 12, the protruding strips are alternately staggered to provide the necessary spacing required for electrical safety. In the present example, a dozen top contact strips 134 and 135 are provided, each of which continues electrically as a blade strip 138 (FIG. 4) bearing at its end contact points 138a. The contact points 138a of contact strips 134 are for engagement with either of two cooperating switch contacts 132a' or 132, leading to terminal strips 132a and 132 extending through the bottom of the casing. The contact points 132a of contact strips 135 are for engagement with either of two cooperating switch contacts 133a' or 133', leading to terminal strips 133a and 133 extending through the bottom of the casing. Each flexible strip 138 has a tongue 138b struck out of it which serves as a cam follower, as will be described below, whereby the switch is positioned in any one of three positions. Thus, for example, the switch contacts carried at the end of flexible strip 138 for contact strip 134 may be in the neutral position shown in FIG. 4 wherein it is out of contact with both 132a' and 132', or the right and left positions, where it engages contacts 132' and 132a' respectively. The switch contacts carried at the end of flexible strip 138 for contact strip 135 may be similarly positioned with respect to contacts 133a and 133. Rotation of the cam wheel 304, as will be described below, therefore determines the electrical condition of the switch in accordance with the cam contour which engages follower 138b. It will be seen that there are twice as many terminal strips in the bottom set as in the top set, and alternate ones of the bottom set of strips are also staggered, to conserve space, similar to the top set. Thus, in the embodiment shown, twenty-four different circuits can be turned either on or off in various combinations, in accordance with the cam configurations which drive them. For use in a washing machine, this is more than adequate to provide all of the necessary operations which the circuits of present-day washing machines are capable of performing.

Referring now to FIG. 5, the cam drum assembly which drives the switches 138 is generally indicated at 501. This is preferably built up as a stack of laminated plastic discs 139, the circumference of each disc serving as the cam surface for one of the switch blades 138. Each disc circumference is therefore shaped to provide the desried high, low, and intermediate portions, as indicated in FIG. 4. In the embodiment shown, the cam followers 138b of the individual switches 138 are laterally spaced from each other by the width of five discs 139. Thus at any one time, every fifth disc is serving to actuate the set of switches, the remaining four intermediate discs being inactive at this time. Means are provided for shifting the entire contact-controlling drum 304 laterally on shaft 235 in five successive steps, so that each fifth set of discs can be made to control the switches, thus providing five separate control programs by lateral shifting. In addition, means are provided, as will be shown below, for rotating the entire contact drum assembly into three different angular positions, each of 120° extent, each said position corresponding to the beginning of a control sequence. Since, due to the economy of motion and space effected by the present invention, any program sequence can readily be accomplished in only 120° rotation of the drum, this is sufficient to provide for three more sets of control operations, each corresponding to 120° rotation of the entire drum 304. In order to provide the lateral motion, the drum 304 is fixed at one end to a hub 242 which is free to move both radially and axially on shaft 235. This hub has a groove 242a for receiving a pin 123b (FIG. 12) which is fixed to drum positioning arm 123a, which is manually set by the user as will be described below. Shaft 135, at the left end thereof, has fixed thereto a hub 234 having a longitudinal keyway 234a therein. The end of the contact drum comprises a plate 140 apertured to receive hub 234, and having a depending key 140a in said aperture which fits into keyway 234a, so that as shaft 235 is rotated, the drum will rotate with it, while being free to slide laterally along the hub 234. This lateral motion is provided by lateral positioning arm 123a. Fixed to the hub 234 is a cup gear 131, which is the sheet-metal stamped equivalent of a bevel gear. It will now be apparent that rotation of gear 131 will produce the angular positioning of contact drum 501, while movement of arm 123a will provide the lateral positioning of the drum. Since there are five lateral positions and three angular positions, it will be apparent that the arrangement shown provides for fifteen different programs.

Both the angular and the lateral position are accomplished by rotation of setting knob 214a, which is fixed to sleeve 214, the sleeve in turn supporting switch shaft 218. This switch shaft controls the starting and stopping of the motor 155 which drives the entire mechanism. Sleeve 214 has a longitudinal keyway 214b cut into it, and fixed to the remote end of it is a plate 114. Sleeve 214 is supported in the front plate or wall 530 of the casing 154, which is drilled to receive it, and by plate 113 which is supported on wall 530 in spaced relation therefrom, being free to both turn and move axially with respect to the two supporting plates. Mounted on sleeve 214 between these two plates are three cams 146, 147 and 148, each formed of a thin sheet of metal in the order of 1/16 inch thick, and each having a key portion which fits into the keyway 214b (FIG. 12), so that the sleeve 214 can slide axially with respect to these cams but rotation of the sleeve will cause the cams to rotate therewith. Cams 146 and 148 respectively provide for the lateral and the radial positioning of the contact drum previously described. The arrangement is such that successive angular intervals of 60° rotation (counter-clockwise) of setting knob 214b alternately cause first one cam follower and then the other to move to produce a desired setting while the opposite cam follower either remains stationary, in the case of cam 148, or else moves the drum axially back to its initial position, in the case of cam 146, as will now be explained. Thus, referring to FIGS. 6 and 7, during the first 60° angle A, cam follower 123c which is biased by spring 123d toward the cam contour, is moved in five regularly-spaced steps toward the left, and thus moves U-shaped arm 123 on its pivot 222 to the left. This carries pin 123b, which is fixed to the opposite end of arm 123 also to the left. Pin 123b rests in groove 242a which is fixed to the contact drum 501, and thus moves the contact drum laterally. During this same angular motion (see A, FIG. 7), cam 148 is also being rotated through 60°, since it is keyed to sleeve 214, but this cam has a dwell portion during this travel, so that its cam follower 128a does not move during this period. During the following 60° (B), cam follower 128a is moved to the left by the active face 148b of cam 148, thus carrying with it slide 128. This slide carries at its left end a rack 127 which drives a small gear 126. Gear 126 is fixed to bevel gear 139a which meshes with bevel gear 131 fixed to the contact drum 304, as previously described. The arrangement is such that the first 60° of motion of the slide (in angular sector B) causes 120° of rotation of contact drum 501. This motion is made against the bias of a spiral spring 412, one end of which is fixed to the gear 139, and the other end to a stationary part of the frame, so that, when the setting knob is finally moved back to its initial position, the drum is also rotated back to its initial position.

While the above action has been taking place, during the second 60° motion of the setting knob, cam 146 is contoured to bring cam follower 123a back to its initial position, so that the third 60° motion of the setting knob (C) again shifts the contact drum 501 laterally to any one of its five possible positions. The above action is repeated through every following 60° of angular movement of the setting knob, which alternately causes the contact drum to move radially 120° and then to move laterally into any one of its five possible positions.

FIG. 1 shows the manner in which the lateral position is accurately determined. It will be noted that three sets of five holes 114a each are indicated in angular sections A, C, and E. These holes are drilled in disc 114 to which sleeve 214 is fixed. Plate 113, through which sleeve 214 passes, carries a pin 215. When the knob is pulled toward the user, this pin fits into one of the holes in disc 114. It will be apparent that a change in setting can only be made when the knob is pushed toward the device and away from the user. This is the setting position of the knob, the knob being movable between its extreme forward and its extreme rearward position and being held by a suitable detent (not shown) in either of these positions. As will be shown below, the main switch, operated by pushing knob 218a, is also open during the time the setting is accomplished. This switch cannot be turned on (pulled toward the user) until the setting knob 214a is in its operating position (pulled toward the user). Thus the device cannot be made to operate until it has been accurately seated in one of the fifteen possible positions, with the cams in correct alignment with their cam followers. If this position has not been attained, then the setting knob cannot be pulled back, as its pin will not be able to seat in one of the holes. Suitable detent means are preferably provided to locate the setting knob easily into one of its correct setting positions, and this may be accomplished by providing suitable stepped recesses on the contour of cam 146, as shown in FIG. 6.

It will now be shown how the clock motor 155 is made to provide rotational energy for the contact drum 304. This is done through the intermediary of a second drum 305 (FIG. 5) which is loosely mounted on shaft 235. The surface of timer drum 305 is provided by fifteen cam plates, each being a thin disc, in the order of 1/16 inch in thickness. Each of these discs 141 is provided with a cam contour as shown at 141a in FIG. 8. A ratchet wheel 144 is also fixed to the timer drum 305 for rotation therewith. A similar ratchet 145 is fixed to hub 245 which is pinned to shaft 235, so that rotation of ratchet wheel 145 will cause rotation of contact drum 304, since the contact drum is keyed to hub 234 which is also pinned to shaft 235, as previously explained.

The motor 155, through a suitable reduction gearing, drives star-cam 106, which causes arm 101 to alternately oscillate back and forth, moving to the right gradually, and to the left suddenly, as it falls off the cam contour of cam 106. Spring 405 biases the arm 101 to follow the cam contour. A stud 247 is fixed to arm 101, and carries pivotally two pawls 102 and 105, for respectively driving ratchet wheels 144 and 145. Pawl 105 is biased upwardly toward its ratchet wheel 145 by a spring 105a, and a similar spring (not shown) also biases pawl 102 toward engagement with its ratchet wheel 144. As arm 101 rocks back and forth, it will be apparent that pawl 102 will step ratchet wheel 144 each time the arm oscillates, thus carrying with it timer drum 305. For use in a washing machine, the stepping rate is made one per minute, and sixty ratchet steps are provided on wheel 144.

Figure 8:
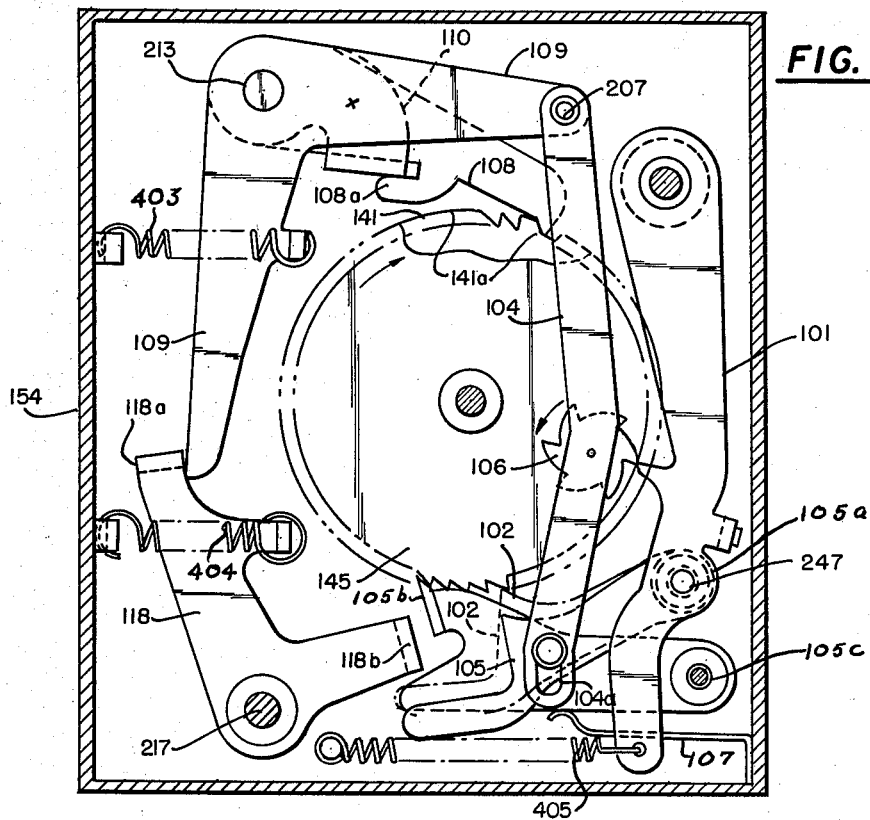
FIG. 8 is a sectional end view taken on line 8—8 of FIG. 3.

Although pawl 105 is biased toward its ratchet wheel 145, it is restrained in the position shown in FIG. 8 from engaging the ratchet wheel by link 104, which has a lost-motion engagement with pawl 105 by virtue of its slot 104a. The other end of link 104 is pivoted at 207 to arm 109 which is fixed to bail 110 (FIG. 9B). Bail 110 is engaged by a hook 108a on timer cam follower 108, so that when the contour of the particular cam surface 141a with which the cam follower 108 is engaged, is such that cam follower 108 is rotated a small distance counter-clockwise as viewed in FIG. 8, arm 109 and link 104 will be raised. This permits pawl 105 to engage its ratchet 145, and while in this condition, the contact drum 501 will also be stepped each time arm 101 reciprocates. However, when the cam contour is such that arm 108 is down, pawl 105 will again be out of engagement with its ratchet and will be ineffectual to drive the contact drum. It is thus apparent that the cam configuration of timer drum cams 141 will determine whether or not the contact drum 304 is stepped at any given time.

It will be apparent that at the same time that one of fifteen possible programs is selected on the contact drum 304 by the means described above, it will be necessary to position timer cam follower 108 to coact with a corresponding one of the fifteen rotary cams which comprise the timer drum 305. This is accomplished by means of cam 147, which rotates when shaft 214 (or the setting knob 214a) is turned (FIG. 12), together with cams 146 and 148. The cam surface causes movement of cam follower 112a, which is fixed to timer cam arm 112, which is pivoted on stud 210. The upper end of the cam arm 112 engages a notch in timer cam arm slide 111, which is free to slide laterally on pin 111a at its left end, and on shaft 213 at its right end. This shaft and pin are fixed to the frame or casing of the device. The slide is biased to the left by means of a coiled spring 202 (FIG. 9). Slide 111 has a projection 111b extending more or less at right angles to its main body, and this projection is slit at 111c to provide a fork, the two fingers of which engage timer cam arm 108 (FIG. 9C), which is also loosely pivoted on shaft 213, and extends between the two fingers of projection 111b, so that as the slide is moved along shaft 213 by cam arm 112, it carries with it the cam arm to position it opposite the desired one of the fifteen cam wheels. The active surface of cam 147 is properly shaped to move the slider and therefore the cam arm 108 to the correct cam disc corresponding to the selected cam surface of contact drum 304. In this manner, the setting of knob 214a to the desired operation position causes selection of both the proper portion of contact drum 304 and of timer drum 305. The timer drum is also provided with a spiral spring 410 (FIG. 5) which biases it back toward its initial or zero setting position, so that when the setting knob is restored to the zero position, both cam drums are also restored to the zero position, suitable stops being provided to normally retain both them and the setting knob 204a in the zero position. A timer drum detent pawl 105b is pivoted on stud 105c, and biased upwardly by leaf spring 107 to engage ratchet 144 to prevent it from slipping back when pawl 102 is not engaged with the ratchet.

Whenever a new program setting is made, it is necessary to first disengage the various cam followers from engagement with their respective cams so that they can be slid laterally without striking raised portions of adjacent cam wheels or segments, and it is also necessary to restore the cam drums 304 and 305 toward their initial setting positions, for which purpose the ratchet detent pawl 105b must be disengaged during this time. This is accomplished by a mechanism which will now be described. It will be remembered that in order to make a new setting, knob 214a must be pushed in, i.e., away from the user. This moves sleeve 214 and its attached disk 114, against which rests an arm 117 (FIG. 10) having a knob 117a which engages this assembly, so that arm 117 is moved counter-clockwise as viewed in FIG. 10, carrying with it shaft 217, which is pinned to it. As best seen in FIG. 8, shaft 217 has fixed to it another arm 118, which is biased in a counter-clockwise direction by coil spring 404. One end of arm 118 has a projection 118a which engages bell crank 109, loosely pivoted on shaft 213, and biased clockwise by coil spring 403. The other leg of bell crank 109 is spot welded or otherwise attached to bell 110 (FIGS. 8 and 9B) on which timer cam arm 108 slides laterally. Thus, when bell crank 109 moves counter-clockwise due to rotation of shaft 217, the cam arm 108 is lifted out of engagement with the cam drum.

The other leg of bell crank 118 carries a projection 118b wide enough to engage projections on both drive pawls 102 and 105, and also on detent 105b, so that when bell crank 118 is rotated clockwise, this disengages all three pawls from their respective ratchet wheels. Thus both cam drums are now free to follow setting rotation of drum 214a. However, the cam follower portions 138b of switches 138 must also be disengaged from contact with the cam surfaces of cam drum 304. This is accomplished by a further link 122 (FIGS. 5 and 10) pivoted to release arm 117 at one end, 122b, and engaging a pin 246 at the other end with a lost-motion connection 122a. Pin 246 is fixed to an insulating shield 303, and when the setting knob 214a is in the operating position (pulled out) shield 303 is in the position shown in FIG. 4, out of engagement with the switch blades. However, when arm 117 is rotated counter-clockwise due to the setting knob being pushed in, release arm link 122 moves shield 303, by the connections above described, so that the edge of shield 303 engages all of the blades 138 to move them into the neutral switching position, when they are out of engagement with any of the cam teeth of the contact drum when the contact drum is in the neutral position, in which it slides laterally. In this manner, all of the cam-engaging elements are disengaged from their cam surfaces when the knob is pushed into the drum setting position, so that the two cam drums will be free to move laterally.

Means are provided to turn the clock motor on and off, preferably in the form of a push button 218a to shaft 218 (FIG. 2), so that when the pushbutton is pressed in toward the machine, the main switch is opened. This is a safety feature for washing machine use, since in an emergency any part of the body of the user can press this switch in and thus stop the operation of the machine, since the switch can also be the main operating switch of the entire machine. At the other end of shaft 128 is a recess portion 218b which is engaged by hook portion 119a (FIG. 11) of a bell crank 119 which is loosely pivoted on shaft 217. The other arm of bell crank 119 has extending from its end at right angles thereto a bifurcated portion 119b, best shown in FIG. 11, which engages a pin 220 fixed to arm 121 which is pivoted on stud 219. A toggle operating bell crank 120 is also pivoted on stud 219 and has at one end a pin 406. A coil spring 121 (FIG. 11) extends between pins 220 and 120a, the arrangement being such that when arm 119 moves to the right as shown in FIG. 11, a snap action is obtained as pin 220 carries the spring past the pivot point 219, causing the other arm 120b of the bell crank 120 to abruptly move counter-clockwise and its pin 406 to engage switch blade 149, causing its contact 149a to engage contact 150 and thereby close the associated circuit. It will be obvious that on return motion of switch knob 218a, the toggle switch will also be abruptly opened.

As previously explained, when setting knob 214a is pushed into the setting position, it is free to rotate. It must be impossible to pull out the switch operating shaft 218 without first locking the setting sleeve 214, since the drive motor should not be started at this time. To accomplish this, a lock pawl 124 is provided, which is pivoted at 124a, and which has a notch 124b at its other end. Lock pawl 124 is biased in a clockwise direction by spring 124c and when the setting knob is pushed back toward the machine into the setting position, the edge of disc 114 falls into notch 124b, preventing return of the setting knob toward the user, until switch 218 is operated. This is accomplished by a bent portion 119c on the end of bell crank 119, which engages lock pawl 124 when switch knob is pulled toward the user to open the switch circuit, releasing the pawl and permitting disc 114 and sleeve 214 to be moved back toward the user. If the setting knob is in the setting position (toward the machine) and latched as described above, but is not properly rotated into one of the setting positions, it cannot be retracted because of the pin 215 not being able to engage one of the fifteen holes previously described. In this condition, the switch circuit cannot be closed, because the edge of disc 114 engages area 119d of bell crank 119, preventing the switch circuit from being closed until the setting knob is properly oriented. Similarly, if the switch is closed and the setting knob is pushed back into its setting position, engagement of disc 114 with area 119d will open the switch as the setting knob is being pushed forward, which is necessary in order to prevent the continued running of the cam drums in an improper position. It will thus be seen that full interlocks are provided to ensure safe operation of the device.

In addition to the foregoing elements, an indicator 130 (FIG. 12) is provided on the front panel of the timer, and is fixed to bevel gear 139a so that it rotates therewith. This indicator turns, in effect, with the contact drum, and therefore can be used to show which section of the contact drum is active at any given time, and more usefully, also shows the progress of the sequence which is being programmed, since it rotates with the drum. It can therefore usefully be divided into three sectors, and the angular position of each sector provides an indication of the progress of the program at any time.

Although the invention has been illustrated for use with a washing machine, it will be apparent that the timer is of general utility for any device requiring a control program of a large number of switching circuits through a predetermined sequence, with the ability to select a large number of different such sequences. However, the invention is of particular utility in connection with such devices as washing machines, and it will be apparent that the invention is applicable to any type of washing machine, by simply changing the cam contours to correspond to the program needs of the device with which it is to be used.

It will be apparent that the embodiments shown are only exemplary and that various modifications can be made in construction and arrangement within the scope of the invention as defined in the appended claims.

I claim:

1. A sequence timer for electrically actuated mechanisms comprising a plurality of cam-actuated electric switches, a switch cam drum carrying a plurality of cam elements for actuating said switches as the drum is rotated, a timer cam drum having a plurality of timer cams, a cam follower for said timer drum, means for selectively engaging said cam follower with any one of said timer cams, rotary drive means, selectively engageable transmission means for engaging said drive means with said switch cam drum to produce rotary motion thereof, and control means actuated by said cam follower for engaging said transmission means in accordance with the cam-following motion of said cam follower.

2. A sequence timer for electrically actuated mechanisms, comprising a plurality of cam-actuated electric switches, a switch cam drum carrying a plurality of cam elements for actuating said switches as the drum is rotated, a timer cam drum having a plurality of timer cams, a cam follower for said timer drum, means for selectively engaging said cam follower with any one of said timer cams, rotary drive means, selectively engageable transmission means for engaging said drive means with said switch cam drum to produce rotary motion thereof, and control means actuated by said cam follower for engaging said transmission means in accordance with the cam-following motion of said cam follower, said timer drum cam comprising a plurality of coaxially mounted cam discs in side-by-side relation, means slidably mounting said cam follower for lateral motion parallel to the axis of said timer drum, and manual control means for slidably moving said cam follower on its mounting means into engagement with any selected one of said cam discs.

3. The invention according to claim 2, each of said electric switches having a cam follower associated therewith, said switch cam drum comprising a plurality of cam discs fixed thereto and uniformly spaced in side-byside relationship for actuating said cam followers as the drum is rotated, said cam followers being spaced along the drum by a distance greater than the spacing of said discs so that only certain ones of said discs, constituting a first set of spaced cam discs, engage switch cam followers to provide a first program of switch operation, the intermediate discs being inactive, and means for electrically shifting the relative position of said cam discs and cam followers so that other ones of said cam discs, respectively intermediate the discs of said first set, and constituting a second set of spaced cam discs, are in engagement with the cam followers to provide a second program of switch operation.

4. The invention according to claim 3, said rotary drive means comprising motor drive means for rotating said timer cam drum at a predetermined rate, and manually operable control means for angularly shifting said switch cam drum relative to said cam followers independently of said motor drive means to present an angularly selected portion of said drum to said followers.

5. The invention according to claim 4, including disengagement means for moving said switch cam followers out of engagement with said cam disc, and means actuated by said manually operable control means for operating said disengagement means prior to angularly shifting said drum by said manual control means.

6. The invention according to claim 5, including program cam means for controlling said means for lateral shifting, other program control means for controlling said means for angularly shifting, manual operable means for driving both said cam means simultaneously, each of said cam means having inactive cam portions engaged with their respective cam followers during the portion of the cam cycle when the cam portion of the other of said cam means are active.

7. The invention according to claim 6, said means for selectively engaging the timer drum cam follower with any one of the timer cams comprising program selector cam means also driven by said manual control means.

8. A sequence timer for electrically actuated mechanisms comprising a plurality of electric switches, each actuated by a cam follower associated therewith, a switch cam drum comprising a plurality of cam discs fixed thereto and uniformly spaced in side-by-side relation for actuating said cam followers as the drum is rotated, said cam followers being spaced along the drum by a distance greater than the spacing of said discs so that only certain ones of the discs, constituting a first set of spaced cam discs, engage cam followers to provide a first program of switch operation, the intermediate discs being inactive, and means for laterally shifting the relative position of said cam discs and cam followers so that other ones of said cam discs, respectively intermediate the discs of said first set, and constituting a second set of spaced cam discs, are in engagement with the cam followers to provide a second program of switch operation.

9. The invention according to claim 8, including disengagement means for moving said cam followers out of engagement with said cam discs and means actuated by said lateral shifting means for operating said disengagement means prior to said lateral shifting of said drums.

10. The invention according to claim 8, including motor drive means for rotating said cam drum to produce a predetermined program of switching operations, manually operable control means for angularly shifting said switch cam drum relative to said cam followers independently of said motor drive means to present an angularly selected portion of said drum to said followers.

11. The invention according to claim 10, including disengagement means for moving said followers out of engagement with said cam discs, and means actuated by said manually operable control means for operating said disengagement means prior to angularly shifting said drum by said manual control means.

12. The invention according to claim 10, including control switch means in circuit with all of said cam switch means for controlling same, and interlock means between said control switch means and said manually operable control means for preventing operation of said manual means when said control switch means are in closed position.

13. The invention according to claim 12, said manual control means having a manual setting position and a normal running position, and further interlock means to prevent operation of said control switch from open to closed position when said manual control means is in the manual setting psition.

14. A sequence timer for electrically actuated mechanisms comprising a plurality of cam-actuated devices, a first cam drum carrying a plurality of cam discs for actuating said devices as the drum is rotated, a timer cam drum having a plurality of timer cams, a cam follower for said timer drum, means for selectively engaging said cam follower with any one of said timer cams, rotary drive means, selectively engageable transmission means for engaging said drive means with said first drum to produce rotary motion thereof, and control means actuated by said timer drum cam follower for engaging said transmission means in accordance with the cam-following motion of said cam follower to drive said first drum intermittently according to a predetermined program.

15. The invention according to claim 14, said drive means comprising a ratchet and pawl drive for stepping said first cam, said selectively engageable means comprising mechanical linkage means for disengaging said ratchet and pawl drive in one cam-following position of the timer drum cam follower and for engaging said ratchet and pawl drive in another position of the cam follower.

16. The invention according to claim 15, said means for selectively engaging said timer cam follower comprising manual control means, and interlock means actuated by said manual means for disengaging all of said cam followers and said ratchet drive means from operative engagement upon operation of said manual control means.

17. The invention according to claim 16, said first cam drum and said timer drum having bias means for restoring said drums to an initial position, and release means operable by said manual control means for engaging said bias means to restore said drums to initial position.

References Cited in the file of this patent

UNITED STATES PATENTS

| | | |
|---|---|---|
| 2,391,718 | Lindemann | Dec. 25, 1945 |
| 2,599,234 | Clark et al. | June 3, 1952 |
| 3,011,079 | Mellinger | Nov. 28, 1961 |